Patented Nov. 28, 1933

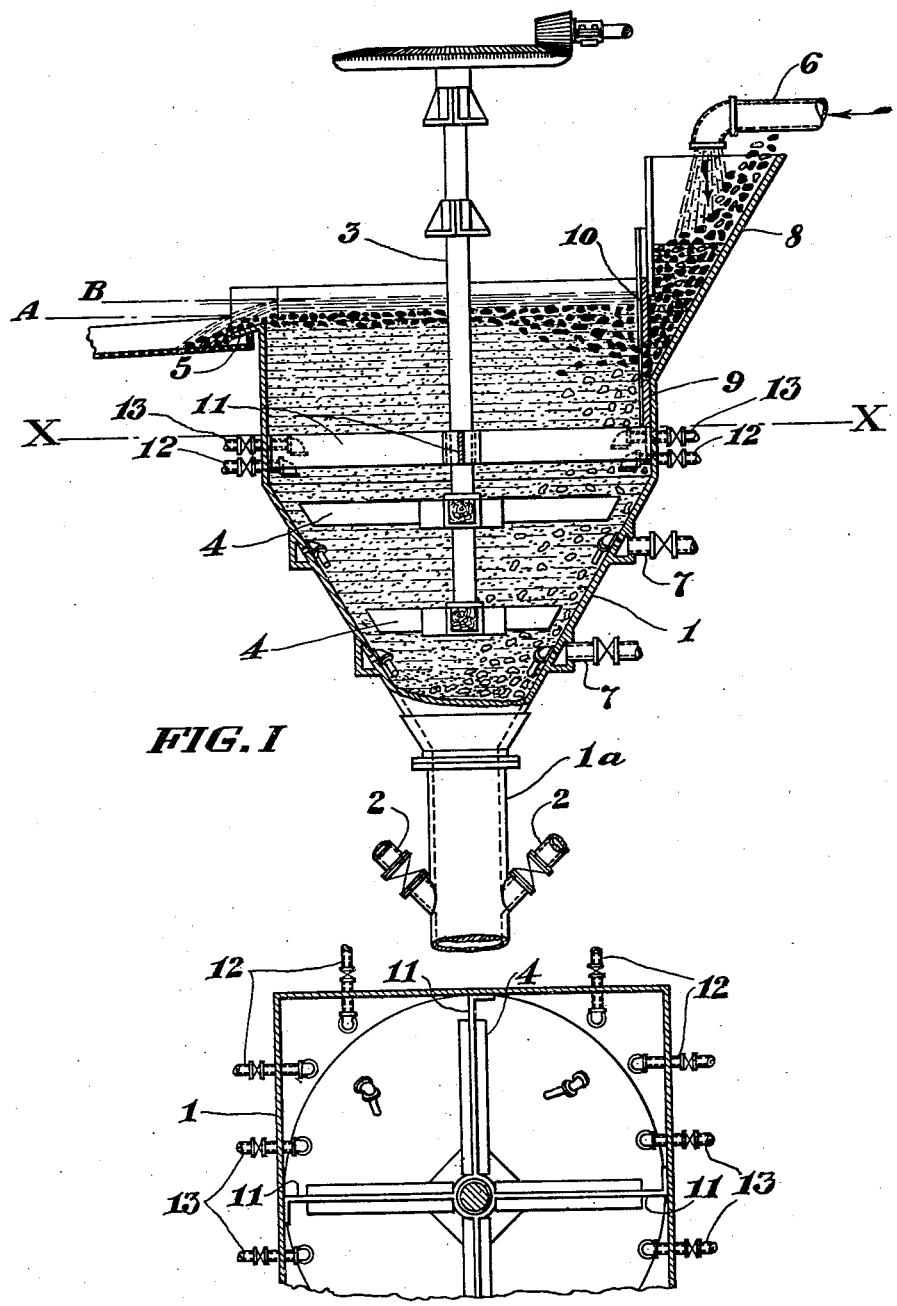

1,937,190

UNITED STATES PATENT OFFICE 1,937,190

APPARATUS FOR AGITATING FLUID MASSES AND SEPARATING MATERIALS

Thomas M. Chance, Wynnewood, Pa.; Florence H. Chance and Provident Trust Company of Philadelphia executors of said Thomas M. Chance, deceased Application January 8, 1932. Serial No. 585,541

2 Claims. (Cl. 209—173)

My invention relates to an improved method and apparatus for separating material of different specific gravities by immersion in a fluid mass composed of a mixture of liquid, such as water, and comminuted solids such as sand, of specific gravity greater than that of said liquid, said fluid mass being of the type disclosed in my former Patents 1,224,138, 1,392,401, and 1,559,937.

The object of my present invention is to provide an improved method of agitating said fluid mass and of translating the lighter materials across the upper surface thereof, whereby the efficiency and capacity of the separating apparatus is improved when the materials to be separated are comparatively small.

In the operation of apparatus of the type disclosed in Fig. I of said Patent 1,559,937, the overflowing fluid mass and liquid carries the lighter separated material floating in the upper part of the fluid mass out of the apparatus. The fluid mass, and supernatant liquid, are given a rotary motion by the revolving agitator and this rotation assists in carrying said lighter materials from the locus of the feed to the overflow weir, over which latter said materials are conveyed by the overflowing fluid mass and liquid. The lighter materials thus flow in an annular path that may be considerably longer than the diameter of the top of the fluid mass. In addition, a comparatively narrow discharge weir may be used so that a relatively deep overflow is provided with a given quantity of overflowing fluid mass and liquid, permitting the discharge of relatively large sized light materials. Apparatus of this type has come into wide commercial use, coal cleaning units of a total annual shipping capacity in excess of 20,000,000 tons being now in operation.

The method just described is not so peculiarly adapted to the treatment of finer materials, such as coal smaller than say three-eights inch in diameter, because the heavy fraction of such finer materials is of low falling velocity and there may not be time for it to filter through the comparatively thick layer, travelling at relatively high surface velocity, rotating in an annular flow type of apparatus. Again, such finer materials do not require great discharge depth over the overflow weir and a relatively wide overflow may be employed.

Such a non-rotating, full-width flow of fine light materials across the fluid mass could be carried out in the apparatus of Fig. III of said Patent 1,559,937, if the separating density and/or shape of the fluid mass containing receptacle would admit of the pure hydraulic agitation provided in said Fig. III. However, I have found that in all the commercial apparatus so far built for the use of the methods of said Patent 1,559,937, either the high separating densities required or the physical proportions of the apparatus have necessitated the use of a rotating mechanical agitator to distribute the agitation water throughout the upper portion of the fluid mass. My present improvement is therefor directed to apparatus using a rotating mechanical agitator, or its equivalent, in conjunction with hydraulic agitation.

I have found that if a sufficient vertical depth of fluid mass be provided above the rotating agitator, that all, or a major part, of the rotation of the top of the fluid mass can be suppressed and a substantially rectilinear flow of the light materials across the upper part of the fluid mass secured.

In the drawing, Fig. I is a vertical partial cross-section illustrating diagrammatically apparatus adapted to carry out the invention and Fig. II is a horizontal partial cross-section of said apparatus on the line X—X of said Fig. I.

In Fig. I, 1 is the separating receptacle adapted to contain a fluid mass of the described type, provided with valved conduits 2, adapted to admit upwardly rising liquid for the agitation of said fluid mass, at the lower portion thereof, through a tubular extension 1a, of the type disclosed in said Patent 1,559,937. Said extension is not however essential to my present invention and conduits 2 may connect directly to receptacle 1. A mechanical rotating agitator shaft 3 is provided with arms, as at 4—4, the rotation of which serves to distribute said rising agitation liquid through the upper portion of said fluid mass. The lighter floating materials are discharged from the upper portion of said fluid mass by causing a conveying fraction of said fluid mass, the upper portion of which is indicated by the line A, together with a layer of supernatant liquid, the top of which is indicated by the line B, to overflow through discharge 5. The comminuted solid and part of the liquid component of said conveying fraction together with part of said layer, are introduced through a conduit such as 6, said conduit returning fluid mass and liquid recovered from said lighter materials after discharge through 5. The rest of the liquid overflowing through 5 is derived from the agitation liquid introduced as at 2. Additional agitation liquid may if desired be introduced in the sides of receptacle 1, as through valved conduits 7.

The feed is introduced through a pressure box 8, adapted to contain a column of raw materials to be separated, and/or liquid, sufficient to produce a vertical pressure that will force said raw materials below the upper surface A against the static pressure of the fluid mass. Vertically and independently adjustable gates 9 and 10 are provided to regulate the depth at which said raw materials are introduced. If it is not desired to so feed the material to be separated, these gates may be raised and the feed introduced above the fluid mass.

While conduit 6 is shown discharging into pressure box 8, this is not a necessary condition and said conduit may discharge into receptacle 1 independently of said pressure box 8. If the construction shown in the drawing be adopted, then the discharge of conduit 6 will assist in agitating the upper portion of the separating fluid mass, but such agitation by a submerged inflow of the conveying element is not herein claimed as it has already been disclosed and claimed by me in my Reissue Patent 17,873 of November 18th, 1930.

The heavy materials falling through the fluid mass pass to the lower portion thereof from whence they may be removed by the methods of said Patent 1,559,937, or by any other desired method.

The lower part of separating receptacle 1 may be of any desired shape adapted to the employment of a diffusing rotating agitating element. I have found in practice that a conical section adapted to contain said element surmounted by a substantially rectangular upper section provides an efficient receptacle. With such a rectangular upper section, overflow 5 and feed box 8, or either of them, may extend across the entire width of the fluid mass, ensuring a minimum depth of the separating materials in their flow across the fluid mass and a maximum discharge capacity for the lighter materials.

While a single slow speed vertical shaft mechanical agitator is illustrated, plural agitators of said type, or high speed impellers may be used. In some cases, rotary agitation to distribute the upward rising agitation liquid may be secured by tangential liquid jets connected to conduits, such as 7, and mechanical agitation dispensed with.

If the separating receptacle 1 is so proportioned to the required volume of agitation liquid, and also to the required quantity of mechanically applied agitation, that there will be a sufficient vertical height of fluid mass above the highest locus of mechanical agitation to substantially suppress rotational motion of the top surface of the separating fluid mass, then a rectilinear flow of comminuted solids and liquid introduced through intake conduit 6 effects the major transport of the materials under separation across said fluid mass. If necessary to further suppress said rotational motion, or if it is not desired to provide such vertical height of fluid mass to in itself suppress said motion, stationary baffles, such as 11, may be provided mechanically restraining said motion, and these may or may not extend upward through the top of said fluid mass.

In operating apparatus of the type of Fig. I, with a rectangular upper portion surmounting a conical lower portion, I have found that the corner volumes above the intersection of said conical portion and said rectangular portion and between the upward projection of the circle of said intersection and the upwardly extending rectangular walls are difficult to maintain in an agitated, fluidic condition. Sand, from the fluid mass, mixed with particles of the materials being separated therein, deposits and dense, immobile banks are formed in said corners. These banks thus tend to convert the upper rectangular separating section into a somewhat conical upward extension of the lower conical portion and at times the angle of repose of said banks is so steep that the separating fluid mass in said upper portion approaches a cylindrical shape. Such banking action is harmful, both in reducing the superficial area of the separating fluid mass and also in permitting rotational motion of the fluid mass in the upper portion, thereby interfering with the rectilinear flow hereinbefore described. The primary object of my invention therefore is to provide a means of reducing this difficulty due to such banking of the sand.

I attain this end by providing one or more agitating jets to maintain fluidity in the region of said corners above the locus of said intersection. Such jets are indicated by the numeral 12, in the horizontal cross-section Fig. II, said jets being connected to a source of liquid under pressure, and adapted to introduce sufficient liquid to restrain the growth of such banks and maintain the desired conditions in the upper part of the separating fluid mass.

At times I further add additional jets, as at 13, under the feed chute and discharge weir to maintain fluidity of the fluid mass across the full width thereof at these locations, and provide a free path for the fall of the heavier separated materials. Such additional jets are not essential, however, to the carrying out of my invention.

Attempts to reduce the difficulties caused by these corner banks by carrying up the conical sides of the lower portion to meet the vertical sides of the rectangular portion, making more or less parabolic intersections therewith, have not accomplished the ends of my invention because no horizontal force is present to cause the upwardly rising agitation water to flow out into such extended conical areas unless there is sufficient rotational effect at that point in the fluid mass to produce a horizontal movement by centrifugal force. Such a rotational effect would, however, defeat the attainment of rectilinear flow across the top of the fluid mass and therefore cannot be employed, banking still occurs on the upwardly extended conical surfaces, and proper functioning of the apparatus is not attained.

It will be understood that in the specification and claims hereof, the terms "comminuted solid" and "liquid" are meant to include any materials, such as sand and water, suitable for use in forming a fluid mass of the described type, and that the term "fluid mass" is meant to include a maintained suspension in said liquid of said solids, substantially insoluble in said liquid, said suspension being of specific gravity greater than that of said liquid. It will further be understood that my invention is not limited to the purely flotational processes of said Patent 1,224,138, but may also be applied to the processes of said Patent 1,392,401, or to combinations of the two.

Having described my invention, I claim:

1. The improved method of separating materials of different specific gravities which consists in immersing said materials in a separatory fluid mass composed of an agitated mixture of liquid and comminuted solids heavier than said liquid, said fluid mass being of specific gravity lower than the heavier of said materials; in producing a substantially horizontal, rectilinear, non-rotary flow of the upper portion of said fluid mass; in causing said flow to carry the lighter of said materials suspended therein from the point of immersion to an overflow without said fluid mass; in permitting the heavier of said materials to sink in said fluid mass and discharge therefrom; in supplying upwardly rising pressure liquid to maintain the agitation of said fluid mass; in effecting lateral diffusion of said pressure liquid through the lower portion of said fluid mass by causing said lower portion to rotate; in substantially destroying all rotational motion in the upper portion of said fluid mass thus permitting said rectilinear flow to be maintained; and in maintaining fluidic conditions throughout said upper portion by supplying additional agitating liquid to said fluid mass in the region above said rotating portion.

2. Apparatus for the separation of materials of different specific gravities by immersion in a separatory fluid mass composed of an agitated mixture of liquid and comminuted solids heavier than said liquid, said fluid mass being of specific gravity lower than the heavier of said materials, comprising in combination, a receptacle adapted to contain said fluid mass; a separatory fluid mass therein; means for introducing said materials into said fluid mass; means for separately discharging said materials from said fluid mass after separation thereby; means for supplying upwardly rising pressure liquid for agitating said fluid mass; means for laterally diffusing said pressure liquid through the lower portion of said fluid mass, said means causing rotation of said lower portion; means for producing a substantially horizontal, rectilinear, non-rotary flow of the upper separatory portion of said fluid mass; means comprising substantially plane rigid surfaces in contact with the top of said rotating portion and adapted to destroy rotational motion by the impact of the rotating solids and liquid thereon, thereby permitting said rectilinear flow to be maintained; and means for maintaining fluidic conditions throughout said upper portion, said means comprising an additional supply of agitating liquid introduced into said fluid mass in the region above said rotating portion.

THOMAS M. CHANCE.